United States Patent
Benazzi et al.

(12)

(10) Patent No.: US 7,300,900 B2
(45) Date of Patent: Nov. 27, 2007

(54) CATALYST COMPRISING AT LEAST ONE ZEOLITE CHOSEN FROM ZBM-30, SM-48 EU-2 AND EU-11 AND AT LEAST ONE Y ZEOLITE AND PROCESS OF HYDROCONVERSION OF HYDROCARBON CHARGES USING SUCH A CATALYST

(75) Inventors: Eric Benazzi, Chatou (FR); Emmanuelle Guillon, Saint Genis Laval (FR); Johan Martens, Huldenberg (BE)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 489 days.

(21) Appl. No.: 10/807,502

(22) Filed: Mar. 24, 2004

(65) Prior Publication Data

US 2004/0232047 A1 Nov. 25, 2004

(30) Foreign Application Priority Data

Mar. 24, 2003 (FR) .................................. 03 03529

(51) Int. Cl.
*B01J 29/072* (2006.01)
*B01J 29/076* (2006.01)
*B01J 29/08* (2006.01)
*B01J 29/14* (2006.01)
*B01J 29/16* (2006.01)
*B01J 29/80* (2006.01)

(52) U.S. Cl. .............................. 502/66; 502/67; 502/71

(58) Field of Classification Search ................... 502/79, 502/66, 71, 74, 67
See application file for complete search history.

(56) References Cited

U.S. PATENT DOCUMENTS

| 4,575,416 A  | * | 3/1986  | Chester et al. ........... 208/111.35 |
|--------------|---|---------|--------------------------------------|
| 4,601,993 A  | * | 7/1986  | Chu et al. ...................... 502/66 |
| 5,055,437 A  | * | 10/1991 | Herbst et al. .................. 502/67 |
| 6,566,293 B1 | * | 5/2003  | Vogt et al. .................... 502/67 |
| 2003/0166453 A1 | * | 9/2003 | Kuvettu et al. ................ 502/68 |
| 2003/0168379 A1 | * | 9/2003 | Degnan et al. ................ 208/27 |
| 2004/0065584 A1 | * | 4/2004 | Bishop et al. ................. 208/27 |

OTHER PUBLICATIONS

Gies et al., Catalog of Disorder in Zeolite Frameworks, ZSM-48, 2002.*

* cited by examiner

*Primary Examiner*—David M Brunsman
(74) *Attorney, Agent, or Firm*—Millen, White, Zelano & Branigan, P.C.

(57) ABSTRACT

A hydrocracking catalyst containing at least one matrix, at least one zeolite chosen from the group formed by the zeolites ZBM-30, ZSM-48, EU-2, and EU-11, at least one Y zeolite, at least one hydro-dehydrogenating metal chosen from the group formed by the metals from Group VIB and Group VIII of the periodic table, optionally at least one element chosen from the group formed by phosphorus, boron and silicon, optionally at least one element from Group VIIA, and optionally at least one element from Group VIIB is used in a process of hydrocracking/hydroconversion of hydrocarbon charges.

19 Claims, No Drawings

CATALYST COMPRISING AT LEAST ONE ZEOLITE CHOSEN FROM ZBM-30, SM-48 EU-2 AND EU-11 AND AT LEAST ONE Y ZEOLITE AND PROCESS OF HYDROCONVERSION OF HYDROCARBON CHARGES USING SUCH A CATALYST

CROSS-REFERENCE TO RELATED APPLICATIONS

This application relates to Applicants' concurrently filed U.S. applications, "CATALYST AND ITS USE FOR IMPROVING THE POUR POINT OF HYDROCARBON CHARGES" (French priority 03/03.530 filed Mar. 24, 2003) and, "CATALYST AND ITS USE FOR IMPROVING THE POUR POINT OF HYDROCARBON CHARGES" (French priority 03/03.531 filed Mar. 24, 2003).

The present invention relates to a catalyst for hydrocracking hydrocarbon charges comprising at least one zeolite chosen from the group formed by the zeolites ZBM-30, ZSM-48, EU-2 and EU-11 and at least one Y zeolite, at least one hydro-dehydrogenating metal chosen from the group formed by the metals from Group VIB and Group VIII of the periodic table, optionally at least one element chosen from the group formed by phosphorus, boron and silicon, optionally at least one element from Group VIIA, and optionally at least one element from Group VIIB.

The invention also relates to a process for hydrocracking/hydroconversion of hydrocarbon charges using a catalyst which comprises at least one matrix, at least one zeolite chosen from the group formed by the zeolites ZBM-30, ZSM-48, EU-2 and EU-11, at least one hydro-dehydrogenating metal chosen from the group formed by the metals from Group VIB and Group VIII of the periodic table, at least one Y zeolite, optionally at least one element chosen from the group formed by phosphorus, boron, silicon, optionally at least one element from Group VIIA, and optionally at least one element from Group VIIB. The invention quite particularly makes it possible to obtain high viscosity oils having viscosity indices (VI) higher than 95-100, preferably comprised between 95 and 150 and more particularly between 120 and 140.

PRIOR ART

The hydrocracking of heavy petroleum cuts is a very important refining process which allows the production, from excess and unprofitable heavy charges, of the lighter fractions such as gasolines, jet fuels and light gasoils which the refiner is seeking in order to adapt production to the structure of the demand. Certain hydrocracking processes also make it possible to obtain a highly purified residue which can constitute excellent bases for oils. With regard to catalytic cracking, the advantage of catalytic hydrocracking is that it provides very high-grade middle distillates, jet fuels and gasoils. The gasoline produced has an octane number much lower than that resulting from catalytic cracking.

One of the great advantages of hydrocracking is that it has great flexibility at various levels: flexibility at the level of the catalysts used, which produces a flexibility of the charges to be treated and at the level of the products obtained. One of the parameters which it is possible to control is in particular the acidity of the catalyst support.

The catalysts used in hydrocracking are all of the bifunctional type combining an acid function with a hydrogenating function. The acid function is provided by supports with large surfaces areas (generally 150 to 800 $m^2.g^{-1}$) having a superficial acidity, such as halogenated aluminas (in particular chlorinated or fluorinated), the combinations of boron and aluminium oxides, amorphous silica-aluminas and zeolites. The hydrogenating function is provided either by one or more metals from Group VIII of the periodic table of the elements, or by a combination of at least one metal from Group VIB of the periodic table and at least one metal from Group VIII.

The balance between the two acid and hydrogenating functions is one of the fundamental parameters which govern the activity and selectivity of the catalyst. A weak acid function and a strong hydrogenating function produce catalysts which are not very active, working at a temperature which is generally high (higher than or equal to 390° C.), and at a low space velocity of feed (the HVR expressed in volume of charge to be treated per volume unit of catalyst and per hour is generally lower than or equal to 2 $h^{-1}$) but having a very good selectivity in middle distillates. Conversely, a strong acid function and a weak hydrogenating function produce catalysts which are active but have less good selectivities in middle distillates. The search for a suitable catalyst will therefore centre on a judicial choice of each of the functions in order to adjust the activity/selectivity ratio of the catalyst.

The standard catalysts for catalytic hydrocracking are, for the most part, constituted by weakly acidic supports, such as amorphous silica-aluminas for example. These systems are more particularly used in order to produce very high-grade middle distillates, and also, when their acidity is very weak, oil bases.

In the weakly acidic supports is found the family of amorphous silica-aluminas. Many catalysts on the hydrocracking market are based on silica-alumina combined, either with a metal from Group VIII or, preferably when the hetero-atomic poison content of the charge to be treated exceeds 0.5% by weight, with a combination of sulphides of the metals of Groups VIB and VIII. These systems have a very good selectivity in middle distillates, and the products formed are of good quality. These catalysts, for the least acidic among them, can also produce lubricating bases. The drawback of all these catalytic systems based on an amorphous support is, as has been said, their weak activity.

The catalysts comprising Y zeolite of the FAU structural type, or the beta-type catalysts have a catalytic activity greater than that of the amorphous silica-aluminas, but have selectivities in light products which are higher. In the prior art, the zeolites used for the preparation of hydrocracking catalysts are characterized by several sizes such as their molar $SiO_2/Al2O_3$ ratio of the skeleton, their crystalline parameter, their pore distribution, their specific surface area, their capacity for uptake of sodium ion, or also their capacity for adsorption of water vapour. Thus in previous patents of the applicant (French patents FR-A-2 754 742 and FR-A-2 754 826) a zeolite is used the crystalline parameter of which is comprised between 24.15 and 24.38 Å (1 Å=0.1 nm), the molar $SiO2/Al_2O_3$ ratio of the skeleton comprised between 500 and 21, the sodium content less than 0.15% by weight, the capacity for uptake of sodium ion greater than 0.85 g Na/100 g zeolite, the specific surface greater than 400 m2/g, the capacity for absorption of water vapour greater than 6% and from 1 to 20% of pore volume is contained in pores with diameter situated between 20 and 80 Å.

U.S. Pat. No. 4,857,170 describes the use in hydrocracking of a modified zeolite with a crystalline parameter less than 24.35 Å but the degree of crystallinity of which is not affected or only slightly affected by modifying treatments.

Moreover, the prior art shows that it has always been sought to keep crystalline fractions (or a degree of crystallinity) and high peak rates in the zeolites used.

The research carried out by the applicant on numerous zeolites and microporous solids have lead to his discovery that, on the contrary and surprisingly, a process using a catalyst containing at least one zeolite chosen from the group formed by the zeolites ZSM-48, ZBM-30, EU-2, EU-11 and at least one Y zeolite allows selectivities in middle distillate (kerosene and gasoil) to be attained which are clearly improved relative to the catalysts known in the prior art.

DETAILED DESCRIPTION OF THE INVENTION

More particularly, a subject of the invention is a composition comprising at least one matrix and at least one (hydro-dehydrogenating) element chosen from the group formed by the elements of Group VIII and Group VIB, said catalyst being characterized in that it contains at least one zeolite chosen from the group formed by the zeolites ZBM-30, ZSM-48, EU-2, and EU-11 and a faujasite-type Y zeolite. The zeolite EU-2 is described in the article in *Journal of Chemical Research*, 192, (1985) and the patent GB 2 077 709-A (corresponding to U.S. Pat. No. 4,741,891; U.S. Pat. No. 4,836,996; U.S. Pat. No. 4,876,412; U.S. Pat. No. 5,098,685), the zeolite ZSM-48 is described in the article Zeolites, U.S. Pat. No. 5,355, (1985), and the patents EP-A-23 089, U.S. Pat. No. 4,397,827, EP-A-15 132, EP-A-142 317 and U.S. Pat. No. 5,961,591, the zeolite EU-11 is described in the article Journal of Catalysis, 85, 135, (1985), and finally the zeolite ZBM-30 is described in the patent EP-A-16 501.

Preferably the zeolites ZSM-48 and ZBM-30 are considered. Still more preferably the zeolite ZBM-30 will be considered, preferably synthesized according to the operating method described in the patent (EP-A-46504) and which requires the use of a structuring agent, advantageously triethylenetetramine.

The overall Si/Al ratio of the zeolites contained in the composition of the catalysts according to the invention as well as the chemical composition of the samples are determined by X-ray fluorescence and atomic absorption.

The Si/Al ratios of the zeolites described above are those obtained during the synthesis according to the operating methods described in the various documents cited or obtained after post-synthesis dealumination treatments well known to a person skilled in the art, such as, and not exhaustively, hydrothermal treatments followed or not followed by acid attacks or also direct acid attacks by solutions of mineral or organic acids.

The zeolites contained in the composition of the catalyst according to the invention are calcined and exchanged by at least one treatment with a solution of at least one ammonium salt in order to obtain the ammonium form of the zeolites which, once calcined, lead to the hydrogen form of said zeolites.

The zeolites contained in the composition of the catalyst according to the invention are at least in part, preferably practically totally, in acid form, i.e. in the hydrogen form ($H^+$). The Na/T atomic ratio is generally less than 10% and preferably less than 5% and even more preferably less than 1%.

The zeolites are prepared according to the techniques generally used in dealumination.

The catalyst according to the invention moreover comprises a hydrogenating function. The hydrogenating function as has been defined previously, preferably comprises at least one metal chosen from the group formed by the metals of Group VIB and Group VIII of the periodic table of the elements.

The catalyst of the present invention contains at least one noble or non noble element of Group VIII such as iron, cobalt, nickel, ruthenium, rhodium, palladium, osmium, iridium or platinum. Amongst the metals of Group VIII it is preferable to use the non-noble metals such as iron, cobalt, nickel. The catalyst according to the invention can contain at least one element of Group VIB, preferably tungsten and molybdenum. Advantageously the combinations of the following metals are used: nickel-molybdenum, cobalt-molybdenum, iron-molybdenum, iron-tungsten, nickel-tungsten, cobalt-tungsten, the preferred combinations are nickel-molybdenum, cobalt-molybdenum, nickel-tungsten. It is also possible to use combinations of three metals for example nickel-cobalt-molybdenum.

The catalyst of the present invention also contains at least one amorphous or poorly crystallized oxide-type porous mineral matrix. Aluminas, silicas, silica-aluminas can be mentioned as non-limiting examples. Aluminates can also be chosen. It is preferable to use matrices containing alumina, in all their forms known to a person skilled in the art, and even more preferably aluminas, for example, gamma alumina.

In one implementation of the invention, the catalyst preferably contains at least one doping element chosen from the group formed by boron, silicon and phosphorus, preferably boron and/or silicon. The catalyst optionally contains at least one element of Group VIIA, preferably chlorine and fluorine, and also optionally at least one element from Group VIIB.

Boron, silicon and/or phosphorus can be in the matrix, the zeolite or are preferably deposited on the catalyst and then mainly localized on the matrix.

The element introduced, and in particular silicon, mainly localized on the matrix of the support can be characterized by techniques such as the Castaing microprobe (distribution profile of the various elements), transmission electron microscopy coupled with X ray analysis of the components of the catalyst, or by distribution mapping of the elements present in the catalyst by electron microprobe.

The catalyst according to the invention moreover contains a Y zeolite, for example of the faujasite type.

Different Y zeolites can be used.

A particularly advantageous H—Y acid zeolite is characterized by different specifications: an overall molar ratio $SiO_2/Al_2O_3$ comprised between approximately 6 and 70 and preferably between approximately 12 and 50: a sodium content lower than 0.15% by weight determined on the zeolite calcined at 1100° C.; a crystalline parameter with elementary mesh comprised between $24.58 \times 10^{-10}$ m and $24.24 \times 10^{-10}$ m and preferably between $24.38 \times 10^{-10}$ m and $24.26 \times 10^{-10}$ m; a CNa capacity for uptake of sodium ions, expressed in grams of Na per 100 grams of modified zeolite, neutralized then calcined, greater than approximately 0.85; a specific surface area determined by the B.E.T method greater than approximately 400 m²/g and preferably greater than 550 m²/g, a water vapour adsorption capacity at 25° C. for a partial pressure of 2.6 torrs (i.e. 34.6 MPa), greater than approximately 6%, and advantageously, the zeolite has a pore distribution determined by nitrogen physisorption, comprising between 5 and 45% and preferably between 5 and 40% of the total pore volume of the zeolite contained in pores with a diameter situated between $20 \times 10^{-10}$ m and $80 \times 10^{-10}$ m, and between 5 and 45% and preferably between 5 and 40% of the total pore volume of the zeolite contained in pores with a diameter greater than $80 \times 10^{-10}$ m and generally smaller than $1000 \times 10^{-10}$ m, the rest of the pore volume being contained in the pores with a diameter smaller than $20 \times 10^{-10}$ m.

A preferred catalyst using this type of zeolite contains a matrix, at least one dealuminated Y zeolite having a crystalline parameter comprised between 2,424 nm and 2,455 nm, preferably between 2,426 and 2,438 nm, an overall molar ratio $SiO_2/Al_2O_3$ higher than 8, a cation content of the alkaline-earth or alkali metals and/or lanthamide cations such as the atomic ratio $(n \times M^{n+})/Al$ is lower than 0.8 preferably lower than 0.5 or also 0.1, a specific surface area determined by the B.E.T method greater than 400 $m^2/g$ preferably greater than 550 $m^2/g$, and a capacity for water adsorption at 25° C. for a P/Po value of 0.2, greater than 6% by weight, said catalyst also comprising at least one hydro-dehydrogenating metal, and silicon deposited on the catalyst.

In an advantageous embodiment according to the invention, a catalyst is considered comprising at least one matrix, at least one element chosen from the group formed by the elements of Group VIII and of Group VIB and a partially amorphous Y zeolite.

By partially amorphous Y zeolite is meant a solid having:

i) a peak level which is lower than 0.40 preferably lower than approximately 0.30;

ii) a crystalline fraction expressed relative to a reference Y zeolite in sodic (Na) form which is less than approximately 60%, preferably less than approximately 50%, and determined by X-ray diffraction.

Preferably, the solid, partially amorphous Y zeolites contained in the composition of the catalyst according to the invention have at least one (and preferably all) of the following other characteristics:

iii) an overall SI/Al ratio greater than 15, preferably greater than 20 and less than 150, iv) an $Si/Al^{IV}$ ratio of the skeleton greater than or equal to the overall Si/Al ratio v) a porous volume at least equal to 0.20 ml/g of solid a fraction of which, comprised between 8% and 50%, is constituted by pores having a diameter of at least 5 nm (nanometers), or 50 Å;

vi) a specific surface area of 210-800 $m^2/g$, preferably 250-750 $m^2/g$ and advantageously 300-600 $m^2/g$ The peak levels and the crystalline fractions are determined by diffraction of the X-rays relative to a reference zeolite, using a procedure derived from the ASTM process D3906-97 "Determination of Relative X-ray Diffraction Intensities of Faujasite-Type-Containing Materials". This process can be referred to for the general conditions for application of the procedure and, in particular, for the preparation of the samples and references.

A diffractogram is composed of characteristic lines of the crystallized fraction of the sample and of a background, essentially caused by the diffusion of the amorphous or microcrystalline fraction of the sample (a weak diffusion signal is linked to the instrumentation, air, specimen carrier, etc.). The peak level of a zeolite is the ratio, in a predefined angular zone (typically 8 to 40° 2θ when copper Kα radiation is used, l=0.154 nm), of the surface area of the lines of the zeolite (peaks) on the total surface area of the diffractogram (peaks and background). This ratio/(peaks and background) is proportional to the quantity of crystallized zeolite in the material. To estimate the crystalline fraction of a sample of Y zeolite, the level of peaks of the sample will be compared to that of a reference considered to be 100% crystallized (NaY for example). The level of peaks of a perfectly crystallized NaY zeolite is of the order of 0.55 to 0.60.

The level of peaks of a standard USY zeolite is from 0.45 to 0.55, its crystalline fraction relative to a perfectly crystallized NaY is from 80 to 95%. The rate of peaks of the solid which is the subject of the present description is less than 0.4 and preferably less than 0.35%. Its crystalline fraction is thus less than 70%, preferably less than 60%.

The partially amorphous zeolites are prepared according to the techniques generally used for dealumination, from Y zeolites available commercially, i.e. which generally have high crystallinities (at least 80%). More generally zeolites can be started from having a crystalline fraction of at least 60%, or of at least 70%.

The Y zeolites generally used in the hydrocracking catalysts are produced by modification of the Na—Y zeolites available commercially. This modification allows the production of zeolites which are called stabilized, ultra-stabilized or also dealuminated. This modification is achieved by at least one of the dealumination techniques, and for example hydrothermal treatment, acid attack. Preferably, this modification is achieved by combination of three types of operations known to a person skilled in the art: hydrothermal treatment, ionic exchange and acid attack.

Another particularly useful zeolite is a totally non-dealuminated and very acidic zeolite.

By totally non-dealuminated zeolite is meant a Y zeolite (FAU, faujasite structural type) according to the nomenclature developed in "Atlas of zeolites structure types", W. M. Meier, D. H. Olson and Ch. Baerlocher, 4$^{th}$ revised Edition 1996, Elsevier. The crystalline parameter of this zeolite can have diminished through extraction of the aluminiums of the structure or skeleton during the preparation but the overall $SiO_2/Al_2O_3$ ratio has not changed because the aluminiums have not been chemically extracted. Such a totally non-dealuminated zeolite thus has a composition of silicon and aluminium expressed by the overall $SiO_2/Al_2O_3$ ratio equivalent to the initial non-dealuminated Y zeolite. The values of the parameters ($SiO_2/Al_2O_3$ ratio and crystalline parameter) are given later. This totally non-dealuminated Y zeolite can be either in the hydrogen form or can be at least partially exchanged with metallic cations, for example using cations of alkaline-earth metals and/or cations of lanthamide metals with atomic numbers 57 to 71 inclusive. A zeolite free of lanthamides and alkaline-earths is likewise preferred for the catalyst.

The Y zeolite which is not totally dealuminated generally has a crystalline parameter greater than 2,438 nm, an overall $SiO_2/Al_2O_3$ ratio less than 8, a molar $SiO_2/Al_2O_3$ ratio of the skeleton less than 21 and greater than the overall $SiO_2/Al_2O_3$ ratio. An advantageous catalyst combines this zeolite with a matrix doped with phosphorus.

The totally non-dealuminated zeolite can be contained by any treatment which does not extract the aluminiums from the sample, such as for example treatment with water vapour, treatment with $SiCl_4$.

The catalyst according to the invention generally contains in % by weight relative to the total mass of the catalyst:

0.1 to 60%, preferably from 0.1 to 50% and even more preferably from 0.1 to 40% of at least one hydro-dehydrogenating metal chosen from the group formed by the metals of Group VIB and Group VIII, 1 to 99% and preferably 2 to 98%, preferably from 5 to 95% of at least one amorphous or poorly crystallized oxide-type porous mineral matrix.

said catalyst also contains from 0.1 to 99%, preferably from 0.1 to 99.8%, preferably from 0.1 to 90%, preferably from 0.1 to 80% of at least one zeolite chosen from the group formed by the zeolites ZBM-30, ZSM-48, EU-2 and EU-11, said catalyst optionally containing;

from 0 to 20%, preferably from 0.1 to 15% and even more preferably from 0.1 to 10% of at least one promoter element chosen from the group formed by silicon, boron and phosphorus, and preferably boron and/or silicon.

0 to 20%, preferably 0.1 to 15% and even more preferably from 0.1 to 10% of at least one element chosen from Group VIIA, preferably fluorine.

0 to 20%, preferably from 0.1 to 15% and even more preferably from 0.1 to 10% of at least one element chosen from Group VIIB.

0 to 40%, preferably from 0 to 30% by weight of a Y zeolite as described previously in the text.

The metals of Group VIB, Group VIII and Group VIIB of the catalyst of the present invention can be totally or partially present in the metallic and/or oxide and/or sulphide form.

This catalyst can be prepared by any of the methods which are well known to a person skilled in the art. Advantageously, it is obtained by mixing of the matrix and the zeolite then the mixture is moulded. The hydrogenating element is introduced during mixing, or more preferably after moulding. The moulding is followed by a calcination, the hydrogenating element is introduced before or after this calcination. The preparation ends with a calcination at a temperature of 250 to 600° C. One of the preferred methods according to the invention consists of kneading the zeolite powder chosen from the group formed by the zeolites (ZSM-48, ZBM-30, EU-2 and EU-11) in a moist alumina gel for a few tens of minutes, then passing the paste thus obtained through a die in order to form extrudates with a diameter comprised between 0.4 and 4 mm.

The hydrogenating function can be introduced only partially (this is the case, for example, for combinations of metal oxides of Groups VIB and VIII) or introduced totally when the zeolite is kneaded, with oxide gel chosen as matrix.

The hydrogenating function can be introduced by one or more ion exchange operations on the calcined support constituted by a zeolite as described previously, dispersed in the chosen matrix, using solutions containing the precursor salts of the chosen metals.

The hydrogenating function can be introduced by one or more impregnations of the moulded and calcined support, by a solution containing at least one precursor of at least one oxide of at least one metal chosen from the group formed by the metals of Groups VIII and the metals of Group VIB, the precursor(s) of at least one oxide of at least one metal of Group VIII preferably being introduced after those of Group VIB or at the same time as the latter, if the catalyst contains at least one metal of Group VIB and at least one metal of Group VIII.

In the case where the catalyst contains at last one element of Group VIB for example molybdenum, it is for example possible to impregnate the catalyst with a solution containing at least one element of Group VIB, followed by dryings and calcination. The impregnation of the molybdenum can be facilitated by addition of phosphoric acid to the ammonium paramolybdate solutions, which also allows the introduction of the phosphorus in order to promote catalytic activity.

In a preferred embodiment of the invention, the catalyst contains as a dope at least one element chosen from silicon, boron and phosphorus. These elements are introduced on a support already containing at least one zeolite chosen from the group formed by the zeolites ZSM-48, ZBM-30, E-2 and EU-11, at least one matrix, as defined above, and at least one metal chosen from the group formed by the metals of Group VIB and the metals of Group VIII.

In the case where the catalyst contains boron, silicon and phosphorus and optionally the element chosen from Group VIIA of halide ions and optionally at least one element chosen from Group VIIB, these elements can be introduced into the catalyst at various levels of the preparation and in various ways.

The impregnation of the matrix is preferably carried out by the "dry" method of impregnation well known to a person skilled in the art. Impregnation can be carried out in a single stage with a solution containing all the elements that make up the final catalyst.

The P, B, Si and the element chosen from the halide ions of Group VIIA, can be introduced by one or more impregnations with excess of solution on the calcined precursor.

In the case where the catalyst contains boron, a preferred method according to the invention consists in preparing an aqueous solution of at least one boron salt such as ammonium biborate or ammonium pentaborate in an alkaline medium and in the presence of hydrogen peroxide and carrying out "dry" impregnation wherein the volume of the pores of the precursor is filled with the solution containing boron.

In the case where the catalyst contains silicon, a solution of a silicon compound of the silicone type will be used.

In the case where the catalyst contains boron and silicon, the deposition of boron and silicon can also be carried out simultaneously using a solution containing a boron salt and a silicone-type silicon compound. Thus, for example in the case where, for example, the precursor is a nickel-molydenum type catalyst supported on a support containing zeolite and alumina, it is possible to impregnate this precursor with aqueous solution of ammonium biborate and Rhodorsil E1P silicone from Rhône Poulenc, to carry out drying for example at 80° C., followed by impregnation with a solution of ammonium fluoride, drying for example at 80° C. and calcination, for example and preferably under air in a fluidized bed for example at 500° C. for 4 hours.

In the case where the catalyst contains at least one element of Group VIIA, preferably fluoride, it is for example possible to impregnate the catalyst with a solution of ammonium fluoride, followed by drying for example at 80° C., and calcination for example and preferably under air in a fluidized bed, for example at 500° C. for 4 hours.

Other impregnation sequences can be implemented to obtain the catalyst of the present invention.

In the case where the catalyst contains phosphorus, it is possible for example to impregnate the catalyst with a solution containing phosphorus, followed by drying and calcination.

In the case where the elements contained in the catalyst, i.e. at least one metal chosen from the group formed by the metals of Group VIII and Group VIB, optionally boron, silicon, phosphorus, at least one element of Group VIIA, at least one element of Group VIIB, are introduced in several impregnations with the corresponding precursor salts, an intermediate stage of drying of the catalyst is generally carried out at a temperature generally comprised between 60 and 250° C. and an intermediate stage of calcination of the catalyst is carried out at a temperature generally comprised between 250 and 600° C.

In order to conclude the preparation of the catalyst, the moist solid is left to rest in a humid atmosphere at a temperature comprised between 10 and 80° C., then the moist solid obtained is dried at a temperature comprised between 60 and 150° C., and finally the solid obtained is calcined at a temperature comprised between 150 and 800° C.

The sources of elements of Group VIB which can be used are well known to a person skilled in the art. For example, among the sources of molybdenum and tungsten, the oxides and hydroxides, molybdic and tungstic acids and their salts in particular the ammonium salts such as ammonium molybdate, ammonium heptamolybdate, ammonium tungstate, phosphomolybdic acid, phosphotungstic acid and their salts, silicomolybdic acid, silicotungstic acid and their salts can be used. Preferably the oxides and the ammonium salts such as ammonium molybdate, ammonium heptamolybdate and ammonium tungstate are used.

The sources of elements of Group VIII which can be used are well known to a person skilled in the art. For example, for the non-noble metals there will be used nitrates, sulphates, phosphates, halides for example, chlorides, bromides and fluorides, carboxylates for example acetates and carbonates. For the noble metals the halides will be used, for example chlorides, nitrates, acids such as chloroplatinic acid, oxychlorides such as ammoniacal ruthenium oxychloride.

The preferred source of phosphate is orthophosphoric acid $H_3PO_4$, but its salts and esters such as ammonium phosphates are also suitable. The phosphorus can be introduced for example in the form of a mixture of phosphoric acid and a basic organic compound containing nitrogen such as ammonia, primary and secondary amines, cyclic amines, compounds of the pyridine family and quinolines and compounds of the pyrrole family.

Numerous sources of silicon can be used. Thus, ethyl orthosilicate $Si(OEt)_4$, siloxanes, polysiloxanes, halide silicates such as ammonium fluorosilicate $(NH_4)_2SiF_6$ or sodium fluorosilicate $Na_2SiF_6$. Silicomolybdic acid and its salts, silicotungstic acid and its salts can also be used advantageously. Silicon can be added for example by impregnation with ethyl silicate in solution in a water/alcohol mixture. The silicon can be added for example by impregnation of a compound of silicone-type silicon suspended in water.

The source of boron can be boric acid, preferably orthoboric acid $H_3BO_3$, ammonium biborate or pentaborate, boron oxide, boric esters. The boron can be introduced for example in the form of a mixture of boric acid, hydrogen peroxide and a basic organic compound containing nitrogen such as ammonia, primary and secondary amines, cyclic amines, compounds of the pyridine family and quinolines and the compounds of the pyrrole family. The boron can be introduced for example by a solution of boric acid in a water/alcohol mixture.

The sources of elements of Group VIIA which can be used are well known to a person skilled in the art. For example the fluoride anions can be introduced in the form of hydrofluoric acid or its salts. These salts are formed with alkali metals, ammonium or an organic compound. In the latter case, the salt is advantageously formed in the reaction mixture by reaction between the organic compound and the hydrofluoric acid. It is also possible to use hydrolyzable compounds which can release fluoride anions in water, such as ammonium fluorosilicate $(NH_4)_2SiF_6$, silicon tetrafluoride $SiF_4$ or sodium tetrafluoride $Na_2SiF_6$. Fluoride can be introduced, for example, by impregnation with an aqueous solution of hydrofluoric acid or ammonium fluoride.

The sources of elements of Group VIIB which can be used are well known to a person skilled in the art. Preferably ammonium salts, nitrates and chlorides are used.

The catalysts thus obtained, in oxide form, can optionally be introduced, at least in part, in the metallic or sulphide form.

The catalysts obtained by the present invention are moulded in the form of grains of various forms and dimensions. They are generally used in the form of cylindrical or polylobate extrudates such as bilobate, trilobate, polylobate extrudates in the straight or twisted form, but can optionally be produced and used in the form of crushed powder, tablets, rings, beads, wheels. They have a specific surface area measured by nitrogen adsorption according to the BET method (Brunauer, Emmett, Teller, J. Am. Chem. Soc., vol. 60, 309-316 (1938)) comprised between 50 and 600 $m^2/g$, a pore volume measured by mercury porosimetry comprised between 0.2 and 1.5 $cm^3/g$ and a pore size distribution which can be monomodal, bimodal or polymodal.

The catalysts thus obtained are used for the conversion of hydrocarbon charges (in the wider sense of transformation) and in particular for hydrocracking.

Charges

The catalysts of the present invention are used for the hydrocracking of hydrocarbon charges such as the oil cuts. The charges used in the process are gasolines, kerosines, gasoils, vacuum gasoils, long residues, vacuum residues, atmospheric distillates, vacuum distillates, heavy fuels, oils, waxes and paraffins, used oils, deasphalted residues or crudes, charges originating from thermal or catalytic conversion processes and their mixtures. They contain heteroatoms such as sulphur, oxygen and nitrogen and optionally metals. Charges originating from the Fischer-Tropsch process are excluded.

The catalysts of the invention are advantageously used for the hydrocracking in particular of heavy hydrocarbon cuts of the vacuum-distillate type, deasphalted or hydrotreated residues or equivalents. The heavy cuts are preferably constituted by at least 80% by volume of compounds the boiling points of which are at least 350° C. and preferably between 350 and 580° C. (that is, corresponding to compounds containing at least 15 to 20 carbon atoms). They generally contain heteroatoms such as sulphur and nitrogen. The nitrogen content is usually comprised between 1 and 5000 ppm by weight and the sulphur content between 0.01 and 5% by weight.

The catalysts used in the process for hydrocracking of hydrocarbon charges according to the invention are preferably subjected to a sulphurizing treatment making it possible to convert, at least in part, the metal species to sulphide before they are brought into contact with the charge to be treated. This activation treatment by sulphurizing is well known to a person skilled in the art and can be carried out by any method already described in the literature.

A standard sulphurizing method well known to a person skilled in the art consists in heating in the presence of hydrogen sulphide at a temperature comprised between 150 and 800° C., preferably between 250 and 600° C., generally in a fluidized bed reaction zone.

The catalyst of the present invention can be advantageously used for the hydrocracking of vacuum-distillatetype cuts strongly charged with sulphur and nitrogen. The sought products are middle distillates and/or oils. Advantageously, the hydrocracking is used in combination with a preliminary hydrotreatment step in a process for the improved production of middle distillates jointly with the production of oil bases having a viscosity index comprised between 95 and 150.

Hydrocracking Processes

The invention also relates to hydrocracking processes using the hydrocracking catalysts according to the invention.

The hydrocracking conditions such as temperature, pressure, hydrogen recycling rate, hourly volume rate, can vary greatly as a function of the nature of the charge, the quality of the desired products and the installations at the refiner's disposal. The temperature is generally higher than 200° C. and often comprised between 250 and 480° C. The pressure is higher than 0.1 MPa and often higher than 1 MPa. The hydrogen recycling rate is at least 50 and often comprised between 80 and 5000 normal liters of hydrogen per liter of charge. The hourly volume rate is generally comprised between 0.1 and 20 volume of charge per volume of catalyst and per hour.

The hydrocracking processes according to the invention cover the fields of pressure and conversion ranging from gentle hydrocracking to high pressure hydrocracking.

By gentle hydrocracking is meant a hydrocracking which leads to moderate conversions, generally lower than 55%, and functioning at low pressure, generally between 2 MPa and 12 MPa.

By high pressure hydrocracking is meant a hydrocracking leading to high conversions, generally higher than 55%, and operating at high pressure, generally higher than 5 MPa.

The catalyst of the present invention can be used alone, in a single or in several catalytic beds, in one or more reactors, in a "one-stage" hydrocracking process, with or without liquid recycling of the non converted fraction, optionally in combination with a catalyst for hydrotreatment situated upstream of the catalyst of the present invention.

In a two-stage hydrocracking process with intermediate separation between the two reaction zones, the catalyst of the present invention is used in the second reaction zone, in one or more beds, on one or more reactors, in combination or not in combination with a hydrorefining catalyst situated upstream of the catalyst of the present invention.

"One-Stage" Process

The one-stage hydrocracking comprises firstly and in a general fashion accelerated hydrorefining the aim of which is to achieve accelerated hydrodenitrogenation and desulphurization of the charge before this is sent on to the hydrocracking catalyst itself, in particular in the case where this comprises a zeolite. This accelerated hydrorefining of the charge only brings about a limited conversion of the charge, into lighter fractions, which remain insufficient and must therefore be completed on the more active hydrocracking catalyst. However, it should be noted that no separation takes place between the two types of catalysts. All of the effluent leaving the reactor is injected onto the hydrocracking catalyst itself and it is only then that a separation of the products formed is carried out. This version of hydrocracking, also called "Once Through", possesses a variant which has a recycling of the non-converted fraction towards the reactor for a more accelerated conversion of the charge.

In a first embodiment or partial hydrocracking still called gentle hydrocracking, the conversion level is less than 55%. The catalyst according to the invention is then used at a temperature generally higher than or equal to 230° C. and preferably 300° C., generally a maximum of 480° C., and often comprised between 350 and 450° C. The pressure is generally higher than 2 MPa and preferably 3 MPa, it is less than 12 MPa and preferably less than 10 MPa. The quantity of hydrogen is at least 100 normal liters of hydrogen per liter of charge and often comprised between 200 and 3000 normal liters of hydrogen per liter of charge. The hourly volume rate is generally comprised between 0.1 and 10 $h^{-1}$. Under these conditions, the catalysts of the present invention have a better conversion, hydrodesulphurization and hydrodenitrogenation activity than the commercial catalysts.

In a second embodiment, the hydrocracking is carried out at high pressure (total pressure higher than 5 MPa), the conversion level is then advantageously higher than 55%.

EMBODIMENT

Two-Stage Process

Two-stage hydrocracking comprises a first stage, the objective of which, as in the "one-stage" process, is to carry out the hydrorefining of the charge, but also to achieve a conversion of the latter of the general order of 40 to 60%. The effluent resulting from the first step is then subjected to a separation (distillation) most often called intermediate separation, the objective of which is to separate the conversion products from the non-converted fraction. In the second stage of a two-stage hydrocracking process, only the fraction of the charge not converted during the first stage is treated. This separation allows a two-stage hydrocracking process to be more selective in middle distillate (kerosene+diesel) than a one-stage process. In fact, the intermediate separation of the conversion products avoids their being "over-cracked" with naphtha and gas in the second stage on the hydrocracking catalyst. Moreover, it should be noted that the non-converted fraction of the charge treated in the second stage generally contains very low contents of $NH_3$ as well as organic nitrogenated compounds, in general less than 20 ppm by weight or even less than 10 ppm by weight.

The catalysts used in the second stage of the two-stage hydrocracking processes are preferably the catalysts based on noble elements of Group VIII, even more preferably the catalysts based on platinum and/or palladium.

In the case where the conversion process of the oil cut is carried out in two stages, the catalysts described within the framework of the process of the invention are used in the second stage.

The process of the present invention can be used for partial hydrocracking, advantageously under conditions of moderate pressure, of cuts for example of the vacuum distillate type strongly charged with sulphur and nitrogen which have been previously hydrotreated. In this method of hydrocracking the conversion level is less than 55%. The catalyst of the first stage can be any hydrotreatment catalyst contained in the state of the art. This hydrotreatment catalyst advantageously comprises a matrix preferably with an alumina base and at least one metal having a hydrogenating function. The hydrotreatment function is ensured by at least one metal or metal compound, alone or in combination, chosen from the metals of Group VIII and Group VIB, such as chosen from nickel, cobalt, molybdenum and tungsten in particular. Moreover, this catalyst can optionally contain phosphorus and optionally boron.

The first step is generally carried out at a temperature of 350-460° C., preferably 360-450° C., a total pressure of at least 2 MPa; and preferably 3 MPa, an hourly volume rate of 0.1-5 h$^{-1}$ and preferably 0.2-2 h$^{-1}$ and with a quantity of hydrogen of at least 100 Nl/Nl of charge, and preferably 260-3000 Nl/Nl of charge.

For the stage of conversion with the catalyst according to the invention (or second stage), the temperatures are generally higher than or equal to 230° C. and often comprised between 300 and 480° C., preferably between 330° C. and 450° C. The pressure is generally at least 2 MPa and preferably 3 MPa, it is less than 12 MPa and preferably less than 10 MPa. The quantity of hydrogen is at least 100 1/1 of charge and often comprised between 200 and 3000 1/1 of hydrogen per liter of charge. The hourly volume rate is generally comprised between 0.15 and 10 h$^{-1}$. Under these conditions, the catalysts of the present invention have better conversion, hydrodesulphurization, and hydrodenitrogenation activity and a better selectivity in middle distillates than the commercial catalysts. The service life of the catalysts is also improved in the moderate pressure range.

In another two-stage embodiment, the catalyst of the present invention can be used for hydrocracking under high pressure conditions of at least 5 MPa. The cuts treated are for example of the vacuum distillate type highly charged with sulphur and nitrogen which have been previously hydrotreated. In this hydrocracking method the conversion level is higher than 55%. In this case, the process of conversion of the oil cut is carried out in two stages, the catalyst according to the invention being used in the second stage.

The catalyst of the first stage can be any hydrotreatment catalyst contained in the state of the art. This hydrotreatment catalyst advantageously comprises a matrix preferably with an alumina base and at least one metal having a hydrogenating function. The hydrogenating function is ensured by at least one metal or metal compound, alone or in combination, chosen from the metals of Group VIII and Group VIB, such as chosen from nickel, cobalt, molybdenum and tungsten in particular. Moreover, this catalyst can optionally contain phosphorus and optionally boron.

The first stage is generally carried out at a temperature of 350-460° C., preferably 360-450° C., a pressure greater than 3 MPa, an hourly volume rate of 0.1-5 h$^{-1}$ and preferably 0.2-2 h$^{-1}$ and with a quantity of hydrogen of at least 100 Nl/Nl of charge, and preferably 260-3000 Nl/Nl of charge.

For the stage of conversion with the catalyst according to the invention (or second stage), the temperatures are generally higher than or equal to 230° C. and often comprised between 300 and 480° C. and preferably between 300 and 440° C. The pressure is generally greater than 5 MPa and preferably greater than 7 MPa. The quantity of hydrogen is at least 100 1/1 and often comprised between 200 and 3000 1/1 of hydrogen per liter of charge. The hourly volume rate is comprised in general between 0.15 and 10 h$^{-1}$.

Under these conditions, the catalysts of the present invention have a better conversion activity and a better selectivity in middle distillates than the commercial catalysts, even for zeolite contents which are considerably lower than those of the commercial catalysts.

In a process for the production of oils advantageously using the hydrocracking process according to the invention, the operation is carried out according to the teaching of U.S. Pat. No. 5,525,209 with a first stage of hydrotreatment under conditions permitting attainment of an effluent having a viscosity index of 90-130 and a reduced nitrogen and polyaromatic compound content. In a subsequent hydrocracking stage, the effluent is treated according to the invention and in such a fashion as to adjust the viscosity index value to that desired by the operator.

The following examples illustrate the present invention without however limiting its scope.

EXAMPLE 1

Preparation-of a Hydrocracking Catalyst C1 (According to the Invention) Containing a Zeolite ZBM-30 and a Y Zeolite- and of a Catalyst C2 (not According to the Invention) Containing the only Y Zeolite The ZBM-30 zeolite is synthesized according to the patent BASF EP-A-46504 with the organic structuring agent triethylenetetramine. Then it is subjected to calcination at 550° C. under dry air flow for 12 hours. The zeolite H-ZBM-30 (acid form) thus obtained has an Si/Al ratio of 45 and an Na/Al ratio less than 0.001.

A hydrocracking catalyst support containing the calcined zeolite ZBM-30 is prepared in the following way:

60 g of the zeolite H-ZBM-30 described below is mixed with 40 g of a matrix composed of ultrafine tabular boehmite or alumina gel marketed under the name SB3 by Condéa Chemie GmbH. This mixture of powder was then mixed with an aqueous solution containing nitric acid at 66% (7% by weight of acid per gram of dry gel) then kneaded for 15 minutes. At the end of the kneading, the paste obtained is passed through a die having cylindrical apertures with diameter equal to 1.4 mm. The extrudates are then dried overnight at 120° C. under air, then calcined at 550° C. under air.

The zeolite ZBM-30 is used to prepare the catalyst C1. The Y zeolite contained in the composition of the catalysts C1 and C2 has a mesh parameter of 24.29 Å, an Si/Al ratio, measured by X-ray fluorescence at 18.2 and a specific surface area of 815 m$^2$/g.

A hydrocracking catalyst support containing the calcined ZBM-30 and Y zeolites is prepared in the following fashion:

10 g of the zeolite H-ZBM-30 and 15 g of Y zeolite described above are mixed with 75 g of matrix composed of ultrafine tabular boehmite or alumina gel marketed under the name SB3 by Condéa Chemie GmbH. This mixture of powder was then mixed with a 66% aqueous solution containing nitric acid (7% by weight of acid per gram of dry gel) then kneaded for 15 minutes. At the end of this kneading, the paste obtained is passed through a die having cylindrical apertures with a diameter equal to 1.4 mm. The extrudates are then dried overnight at 120° C. under air then calcined at 550° C. under air.

This support is then impregnated dry with an aqueous solution of a mixture of ammonium heptamolybdate, nickel nitrate and orthophosphoric acid, dried overnight at 120° C. under air and finally calcined under air at 550° C. The oxide contents by weight of the catalyst C1 thus obtained are 3.0% NiO, 14.0% MoO$_3$ and 4.6% P$_2$O$_5$.

Another support is prepared by mixing 15 g of Y zeolite described above with 85 g of a matrix composed of ultrafine tabular boehmite or alumina gel marketed under the name SB3 by Condéa Chemie GmbH. This mixture of powder was then mixed with a 66% aqueous solution containing nitric acid (7% by weight of acid per gram of dry gel) then kneaded for 15 minutes. At the end of this kneading, the paste obtained is passed through a die having cylindrical apertures with a diameter equal to 1.4 mm. The extrudates are then dried overnight at 120° C. under air then calcined at 550° C. under air.

This support is then impregnated dry with an aqueous solution of a mixture of ammonium heptamolybate, nickel nitrate and orthophosphoric acid, dried overnight at 120° C. under air and finally calcined under air at 550° C. The oxide contents by weight of the catalyst C2 thus obtained are 2.9% NiO, 14.1% MoO$_3$ and 4.3% P$_2$O$_5$.

EXAMPLE 2

Evaluation of the Catalysts C1 and C2 in Hydrocracking of a Vacuum Gasoil

The catalysts C1 and C2 are evaluated in hydrocracking of a vacuum gasoil in high conversion (60-100%) hydrocracking conditions. The oil charge is a hydrotreated vacuum distillate the principal characteristics of which are the following:

| | |
|---|---|
| Density (20/4) | 0.8410 |
| Sulphur (ppm weight) | 15 |
| Nitrogen (ppm weight) | 5 |
| Simulated distillation: | |
| Initial point | 180° C. |
| Point 10% % | 275° C. |
| Point 50% % | 443° C. |
| Point 90% % | 537° C. |
| Final point | 611° C. |

This charge was obtained by hydrotreatment of a vacuum distillate on an HR448 catalyst sold by AXENS comprising one element from Group VIB and one element from Group VIII deposited on alumina.

To the hydrotreated charge is added a sulphur compound which is a precursor of $H_2S$ and a nitrogenated compound which is a precursor of $NH_3$ in order to simulate the partial pressures of $H_2S$ and $NH_3$ present in the second hydrocracking stage. 2.5% sulphur and 1400 ppm of nitrogen are thus added to the charge. The charge thus prepared is injected into the hydrocracking test unit which comprises a fixed-bed reactor, with ascending circulation of the charge ("up-flow"), into which 50 ml of catalyst C1 or C2 have been introduced. Before injection of the charge, the catalyst is sulphurized with a mixture of gasoil+DMDS+aniline up to 320° C. Let it be noted that any in-situ or ex-situ sulphurizing method is suitable. Once the sulphurization is carried out, the charge described above can be converted. The operating conditions of the test unit are the following:

| | |
|---|---|
| Total pressure | 149 MPa |
| Catalyst | 5080 cm³ |
| Temperature | 360-420° C. |
| Hydrogen flow rate | 580 l/h |
| Charge flow rate | 5080 cm³/h |

The catalytic performances are expressed by the temperature which makes it possible to attain a crude conversion level of 70% and by the crude selectivity in middle distillates 150-380° C. These catalytic performances are measured on the catalyst after a period of stabilization, generally at least 48 hours, has been allowed.

The crude conversion CC is taken equal to:

CC=% by weight of 380° C. of effluent

The crude selectivity CS in middle distillate is taken equal to:

$$CS = 100 \times \frac{\text{weight of the fraction}(150\text{-}380° \text{ C.}) \text{ of the effluent}}{\text{weight of the fraction } 380° \text{ C. of the effluent}}$$

The middle distillates obtained are composed of products having a boiling point comprised between 150 and 380° C.

In Table 3 below, the reaction temperature and the crude selectivity are reported for the catalysts C1 and C2, as well as the viscosity indexes values determined on the fractions 380° C.+ after dewaxing with solvent.

Table 3 demonstrates that the use of the catalyst C1 according to the invention containing ZBM-30 and Y zeolite leads to a crude selectivity in middle distillate higher than the catalyst C2 not according to the invention.

Moreover, it clearly emerges that the viscosity indices of the 380° C.+ fractions obtained with the catalysts according to the invention are improved.

TABLE 3

Catalytic activities of the catalysts in hydrocracking high conversion crude (80%)

| Reference | Composition | T(° C.) | Crude selectivity in middle distillate (150-380° C.) (% by weight) | Viscosity index VI 380° C.+ measured after dewaxing with solvent (MIBC*) |
|---|---|---|---|---|
| C1 | NiMoP/ZBM-30 + Y—Al₂O₃ | 384 | 67.8 | 123 |
| C2 | NiMoP/Y—Al₂O₃ | 386 | 65.4 | 118 |

*MIBC = methyl isobutyl ketone

The entire disclosure of all applications, patents and publications, cited herein and of corresponding French application No. 03/03.529, filed Mar. 24, 2003 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst comprising at least one matrix and at least one hydro-dehydrogenating element chosen from elements of Group VIII and Group VIB, said catalyst also contains at least one Y zeolite, a ZBM-30 zeolite.

2. A catalyst according to claim 1 which the ZMB-30 zeolite is synthesized in the presence of triethylenetetramine.

3. A catalyst according to claim 1 in which the Y zeolite is partially amorphous.

4. A catalyst according to claim 1 which contains at least one amorphous or poorly crystallized oxide porous mineral matrix.

5. A catalyst according to claim 1 which contains at least one doping element chosen from the group formed by boron, silicon and phosphorus.

6. A catalyst according to claim 5, comprising at least one group VIII element, at least one group VIB element, and at least one amorphous or poorly crytallized oxide porous mineral matrix.

7. A catalyst according to claim 1 which contains at least one element of Group VIIA.

8. A catalyst according to claim 1 which contains at least one element of Group VIIB.

9. A catalyst according to claim 1 which contains in % by weight relative to the total mass of the catalyst:
- 0.1 to 60% of at least one hydro-dehydrogenating metal chosen from the group formed by the metals of Group VIB and Group VIII,
- 1 to 99% of at least one amorphous or poorly crystallized oxide-type porous mineral matrix,
- 0.1 to 99% of ZBM-30,
- 0 to 20% of at least one promoter element chosen from the group formed by silicon, boron and phosphorus,
- 0 to 20% of at least one element chosen from Group VIIA,
- 0 to 20% of at least one element chosen from Group VIIB,
- 0.1 to 40% by weight of a Y zeolite.

10. In a process comprising subjecting a hydrocarbon change to catalytic hydroconversion/hydrocracking the improvement wherein the catalyst is according to claim 1.

11. A hydroconversion/hydrocracking process according to claim 10 carried out in one stage.

12. A hydroconversion/hydrocracking process according to claim 11 carried out under conditions of pressure greater that 5 MPa and leading to a conversion greater than 55%.

13. A hydroconversion/hydrocracking process according to claim 11 carried out under conditions of pressure comprised between 2 and 12 MPa and leading to a conversion less than 55%.

14. A hydroconversion/hydrocracking process according to claim 10 carried out in two stages.

15. A hydroconversion/hydrocracking process according to claim 10 in which the charges used are gasolines, kerosines, gasoils, vacuum gasoils, long residues, vacuum residues, atmospheric distillates, heavy fuels, oils, waxes and paraffins, used oils, deasphalted residues or crudes, charges resulting from thermal or catalytic conversion processes and their mixtures.

16. A catalyst to claim 1, comprising nickel and molybdenum as hydro-dehydrogenating metal, alumina as a matrix, and phosphorus as a promoter.

17. A catalyst according to claim 16 in which the Y zeolite is partially amorphous.

18. A catalyst according to claim 17 in which the ZBM-30 zeolite is synthesized in the presence of triethylenetetramine.

19. A catalyst according to claim 16 in which the ZMB-30 zeolite is synthesized in the presence of triethylenetetramine.

* * * * *

UNITED STATES PATENT AND TRADEMARK OFFICE
CERTIFICATE OF CORRECTION

| | | |
|---|---|---|
| PATENT NO. | : 7,300,900 B2 | Page 1 of 1 |
| APPLICATION NO. | : 10/807502 | |
| DATED | : November 27, 2007 | |
| INVENTOR(S) | : Eric Benazzi | |

It is certified that error appears in the above-identified patent and that said Letters Patent is hereby corrected as shown below:

On the title page, item (54) and col. 1, line 2, reads "SM-48" should read -- SM-48, --
Column 16, line 48 reads "zeolite, a" should read -- zeolite and a --
Column 16, line 49 reads "claim 1 which" should read -- claim 1 in which --
Column 16, line 49 reads "ZMB-30" should read -- ZBM-30 --
Column 17, line 14 reads "hydroconversion/hydrocracking the" should read
-- hydroconversion/hydrocracking, the --
Column 18, line 21 reads "ZMB-30" should read -- ZBM-30 --

Signed and Sealed this

Twenty-fourth Day of June, 2008

JON W. DUDAS
*Director of the United States Patent and Trademark Office*